3 Sheets—Sheet 1.

E. H. JANNEY.

Assignor, by mesne assignments, to the JANNEY CAR COUPLING CO.

Car Coupling.

No. 8,153. Reissued April 2, 1878.

WITNESSES:
Robt. R. Moore
Cornelius Cox

INVENTOR:
ELI H. JANNEY,
BY
A. W. Beadle & Co.,
ATTYS.

E. H JANNEY.

Assignor, by mesne assignments, to the JANNEY CAR COUPLING CO.

Car Coupling.

No. 8,153. Reissued April 2, 1878.

WITNESSES:
Theodore S. West.
Robt. R. Moore

INVENTOR:
ELI H. JANNEY,
BY
A. M. Beadle & Co.
ATTYS.

E. H JANNEY.

Assignor, by mesne assignments, to the JANNEY CAR COUPLING CO.

Car Coupling.

No. 8,153. Reissued April 2, 1878.

WITNESSES:

Theodore S. West.

Robt. R. Cooke

INVENTOR:

ELI H JANNEY,

BY

A. M. Beadle & Co.,

ATTYS.

UNITED STATES PATENT OFFICE.

ELI H. JANNEY, OF ALEXANDRIA, VIRGINIA, ASSIGNOR, BY MESNE ASSIGNMENTS, TO THE JANNEY CAR COUPLING COMPANY, OF SAME PLACE.

IMPROVEMENT IN CAR-COUPLINGS.

Specification forming part of Letters Patent No. 138,405, dated April 29, 1873; Reissue No. 8,153, dated April 2, 1878; application filed February 7, 1878.

*To all whom it may concern:*

Be it known that I, ELI H. JANNEY, of Alexandria, county of Alexandria, and State of Virginia, have invented a new and useful Car-Coupling, and I do hereby declare that the following is a full and exact description of the same, reference being had to the accompanying drawings, and to the letters of reference marked thereon.

This invention relates to that class of car-couplings which may be termed "twin couplings"—that is, those in which the coupling parts, *per se*, are identical in construction—and also to a subdivision of that class which may be termed "hook-couplings." It is to be distinguished, however, from that class of couplings where two swinging and interlocking hooks are employed—that is to say, hooks having the nose rigid with the shank, and having the pivotal point in the shank, so that the nose or head swings with the shank in the arc of a circle, it forming, in fact, a new and different species of the genus of hook-couplings, which may be properly designated by the term "pivoted nose."

Its novelty consists, mainly, first, in making the nose, or that part which projects laterally beyond the inner line of the shank of the hook, independent of the shank itself, and in pivoting the same thereto in such manner as to be capable of turning from the inner side of the same outward beyond the inner line of the shank, for the purpose of opening the entrance into the hook-recess; second, in the combination, with a pivoted nose and rigid shank, of a guard-arm for preventing the separation of the parts in a lateral direction when the same are coupled; and, third, in the combination, with a pivoted nose, of a lever-arm and automatic mechanism for locking the same in place.

Figure 1:
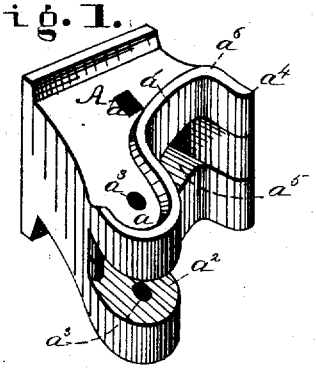
Figure 2:
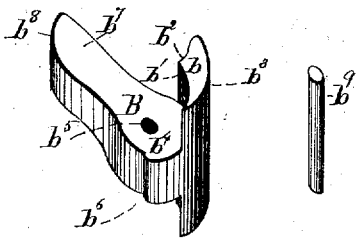
Figure 3:
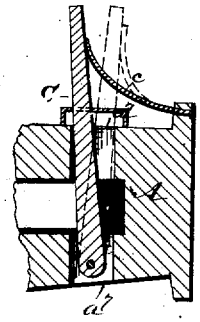
Figure 4:
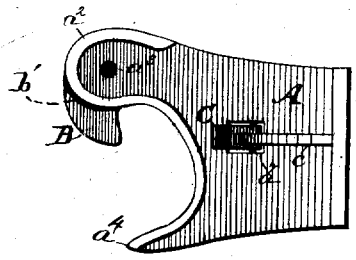
Figure 5:
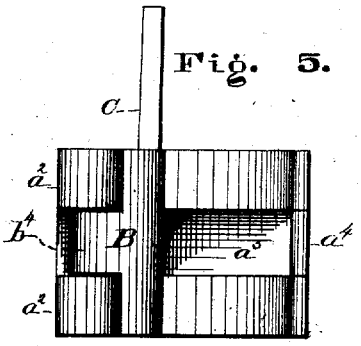
Figure 6:
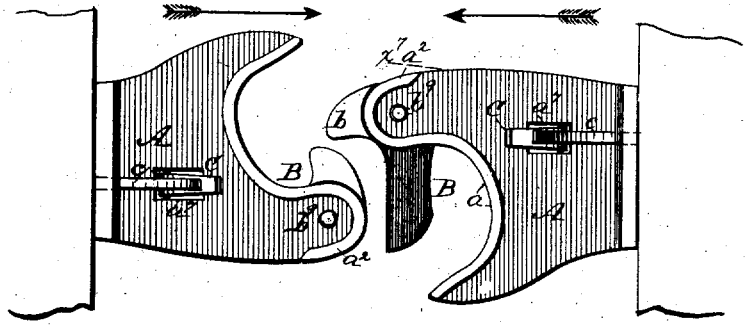
Figure 7:
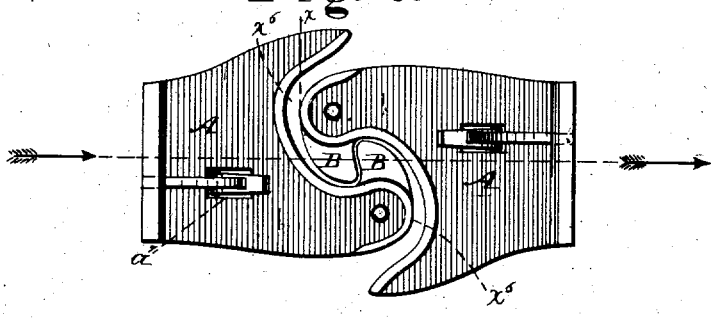
Figure 8:
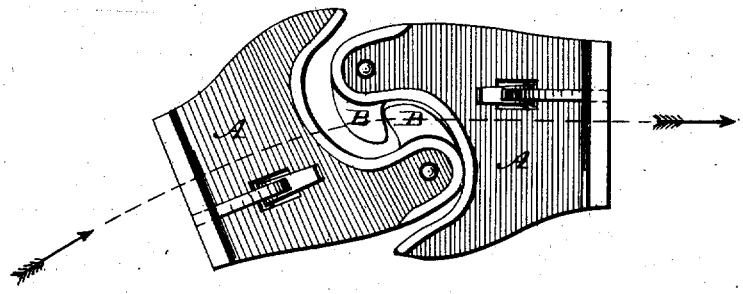
Figure 9:
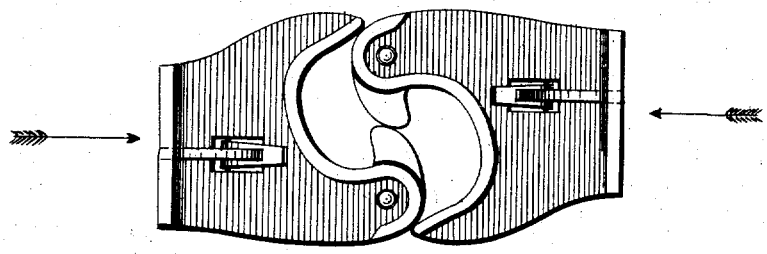
Figure 10:
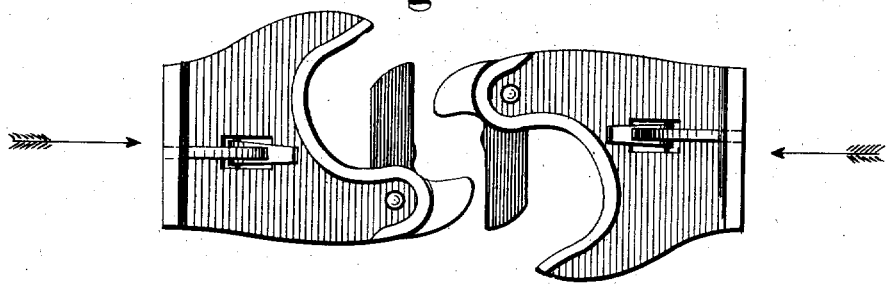
Figure 11:
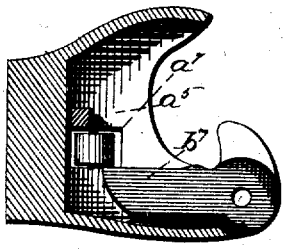
Figure 13:
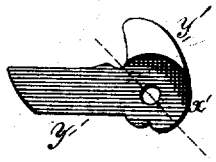
Figure 12:
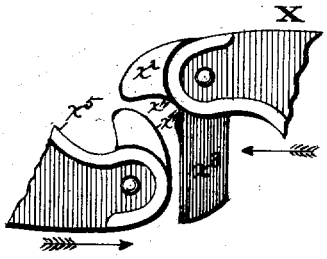

In the drawings, Figure 1 represents a perspective view of the draw-head proper; Fig. 2, a perspective view of the rotary hook and pivot-pin; Fig. 3, a sectional elevation of the locking-lever; Fig. 4, a plan view of a single coupling complete; Fig. 5, a front view of the same; Fig. 6, a plan view of two couplings in position for coupling; Fig. 7, a plan view of two couplings united; Fig. 8, a plan view of the same in the position assumed in turning curves; Fig. 9, a plan view of two couplings brought together without uniting; Fig. 10, a plan view of two couplings, each of which has its movable portion in its open position; Fig. 11, a transverse section of a single coupling; and Figs. 12 and 13, drawings illustrating the principle of operation of the coupling.

To enable others skilled in the art to make and use my invention, I will now proceed to describe fully its construction and manner of operation.

A, Fig. 1, represents the draw-head proper, which may be constructed generally in any suitable form. It is essentially provided, however, with an extended portion, $a$, which projects forward from the front face of the main portion sufficiently far to form a suitable recess, $a^1$, for receiving the proper parts of the fellow coupling. This extension, which is rigidly united to the main portion, forms, in fact, a shank for supporting the independent hook-nose hereinafter described. $a^2$ represents a recess centrally located on a vertical line through the shank $a$, near its front end, which is adapted to receive the hub of the pivoted nose before referred to. $a^3$ $a^3$ represent vertical openings extending through the ears of the shank $a$, which are adapted to receive the pivot-pin upon which the hub of the pivoted nose rotates.

The draw-head is also provided, upon that side which is opposite to the extension $a$, with an extended portion, $a^4$, which projects forward from the main portion of the draw-head beyond the transverse line $x$, Fig. 7, reached by the extreme end of the opposite coupling, when the parts are coupled and under draft-strain, as shown, for the purpose of preventing absolutely, under any circumstances, the separation of the coupled parts by lateral movement. This extension also, by means of its inclined face, serves as a guide to properly direct the parts as they come together.

$a^5$, Figs. 1, 5, and 11, represents a horizontal recess formed in the front end of the draw-head, which is adapted to receive the lever-arm $b^7$, Figs. 2 and 11, of the pivoted nose, as shown. $a^6$ represents a projecting rib or flange extending about the front edges of the draw-head upon its upper and lower faces, which is employed for the purpose of enlarging the bearing-surface of the face without adding materially to the weight.

$a^7$ $a^7$, Figs. 1 and 7, represent slotted openings in the upper and lower faces of the draw-head, which are adapted to receive the locking-lever, hereinafter described.

B represents what may be termed a "hook-nose," consisting of a vertical bar, $b$, nearly triangular in cross-section, the inner face $b^1$ of which is curved to correspond with the circular end of the draw-head shank $a$, against which it bears, as shown in Fig. 4, the bearing-face $b^2$ of which is provided with proper curves for permitting the parts to interlock when in their coupled position, as shown in Fig. 7, and the outer face $b^3$ of which is curved to furnish a proper inclined bearing-surface to fit properly the recess of the opposite coupling when the parts are in their coupled position, as shown also in Fig. 7, and for other purposes hereinafter explained.

$b^4$, Fig. 2, represents the hub of the hook-nose, which is secured to the vertical center of the same, upon its inner face, and is provided with a vertical opening, $b^5$, for the pivot-pin $b^9$, as shown. $b^6$ represents a projecting portion formed upon the hub at the proper place, by means of which the rotary motion of the latter may be checked at the proper point.

$b^7$ represents a lever-arm projecting from the hub $b^4$ at or about right angles to the nose, which is provided at its rear end with a beveled or inclined face, $b^8$, as shown. The hub $b^4$, when in place, rests in the recess $a^3$ of the draw-head, as shown in Fig. 5, and is properly secured in place by a vertical pin, $b^9$, Figs. 2 and 6, which forms the axis upon which it rotates.

C, Fig. 3, represents a pivoted lever, and $c$ a spring adapted, when free to act, to move the lever into proper position to lock the lever-arm of the pivoted nose.

Any form of spring may, of course, be employed in connection with the lever.

The latter also, if desired, may be arranged to project from the side, instead of the top, of the draw-head.

The operation of my invention will now be described. For convenience and clearness, it will be referred to under separate heads, as follows: The operation in coupling, in uncoupling, in buffing, and in turning curves.

The operation in coupling: The ends of adjacent cars having each been provided with one of the couplings described, the two may be united for the purpose of attaching the cars together, in the following manner: The pivoted nose of one of the couplings, before the cars come together, should be rotated on its axis in an outward direction into about the position shown in Fig. 6, for the purpose of opening the entrance into the recess $a^1$ of the draw-head, to admit the proper part of the fellow coupling. When turned into this position, the lever-arm, forming a rigid portion of the nose, is caused to extend across the mouth of the entrance in proper position to be acted upon by the entering portion, as shown. When thus arranged, the cars may be brought together in the same manner as when other automatic couplings are employed—that is, with sufficient force to cause the parts to engage with each other. By this action the lever-arm, which extends across the entrance, will be struck by the entering part of the fellow coupling, and be consequently swung around on its axis into the horizontal recess of the draw-head. The rearward movement of this arm continues until its extreme rear end has passed beyond the locking-lever, as shown in Fig. 11, the latter being moved back from its normal position, as indicated in dotted lines, Fig. 3, to permit its passage by the inclined face $b^8$. By the return movement of the locking-lever to its normal position through the action of its spring $c$, after the lever-arm has passed beyond it, a barrier is placed in the path of the latter, so that its return is impossible.

By the rotation of the lever-arm the pivoted nose attached to the same is turned in behind the locked nose of the fellow coupling as the latter enters the recess through the open entrance, and is carried to bear against its inner face, as shown in Fig. 7.

Being locked in this position by means of its lever-arm, as before described, the union is complete, and separation cannot occur. The entire coupling, when one of the noses is locked, may also be regarded as a rack-bar and pinion, the movable portion of the open half X, Fig. 12, corresponding to the segment of a pinion or gear-wheel, and the closed half to a horizontal moving rack-bar.

A segment only of the pinion is employed, consisting of the hub $x^1$ and the two teeth $x^3$ $x^3$, one of which is made longer than the other, to obtain, when locked, greater leverage and holding power in resisting the draft-strain. The remaining members of the series of teeth, being superfluous, are dispensed with. The rack-bar also has only two teeth, $x^4$ $x^5$, and these are modified in form to better adapt them for the purpose for which they are employed.

The operation of the parts, it will be observed, is much the same as when any rack-bar is employed to revolve a pinion—that is, the teeth of the rack-bar in its longitudinal movement successively engage with the teeth of the pinion and cause revolution.

From the nature of this construction and operation it follows that both of the parts $x^4$ $x^5$ of the rack-bar assist in the rotation of the pinion-segment or pivoted nose, the first, $x^4$, acting principally to give the initial movement, as before described, and the latter, $x^5$, the final movement, because at this time the tooth or lever-arm $x^3$ has swung out of the line of movement of the tooth $x^4$.

The movable portion B has already been considered as the pivoted nose of a hook, the shank of which is formed by the draw-head itself. The nose alone, it will be understood, is not a hook, but only a part of one, it being essential that the draw-head should unite with the same to make it complete. The movable portion B has also been considered as a pinion-segment, the axis of which is simply supported by the draw-head. The nose portion, in this view of the case, is not a hook, but simply a pinion-tooth of modified form, the lever-arm being another tooth of the same series. The movable portion B as a whole—that is, as united to its lever-arm—may be considered as a simple hook, Fig. 13, which is pivoted in the angle of its bend in such manner that a line through its pivot-point will separate it into the two parts common to every hook of shank $y$ and nose or head $y^1$. In this view of the case also the nose alone does not constitute a hook, for if the shank be omitted all resemblance to a hook is entirely destroyed.

The guard-arm serves, by means of its inclined face, to guide the parts properly as they come together.

If desired, both of the movable parts of the coupling may be opened to effect a coupling, as shown in Fig. 10, in which case the operation will be similar to that of two pinion-segments turning on each other.

When the parts are coupled, accidental separation is absolutely impossible while the cars remain on the track.

Separation cannot occur in a longitudinal direction, because the bearing-faces of the hook-noses overhang each other. Separation cannot occur in a lateral direction, because each guard-arm projects beyond the end of the fellow coupling under all circumstances, and prevents movement to either side.

The operation in uncoupling: When it is desired to detach the cars from each other, either one of the levers C is drawn back from its normal position sufficiently far to release the end of the lever-arm. By this means the pivoted nose attached thereto is unlocked, and, being free to move, consequently offers no resistance to the withdrawal of the other hook.

The operation in buffing: The impact of the cars in buffing is taken by the hook-heads, shanks $a$, and opposite draw-head recesses, so that no auxiliary devices are required for this purpose. The line of curvation of the projecting portion of one draw-head and the recess of the other, in which it rests, are nearly the same, so that a large bearing-surface is furnished to take the buffing-thrust.

The operation in turning curves: When the coupled parts lie in the same straight line, an open space, $x^6$, Fig. 7, will be observed between the hook-head and adjacent face of the draw-head. By means of this space the head of the hook is permitted to swing upon the bearing-face of its nose as a pivot-center, as shown in Fig. 8, to permit the couplings to change position relatively to each other in passing curves. By means of this construction freedom of movement is obtained without longitudinal play, and without the possibility of accidental separation.

If desired, separate cars may be brought together at any time without coupling by simply locking the nose of each, as shown in Fig. 9.

Some of the advantages of the described construction are as follows: The parts are readily connected with each other, and when united are so closely interlocked as to prevent longitudinal play. This is accomplished by the intermeshing of the tooth $x^3$, Fig. 12, of the pinion between the teeth $x^4$ $x^5$ of the rack-bar. The nose of the coupling also, when in its open position, does not project beyond the outer line, $x^7$, Fig. 6, of the draw-head, in consequence of which it is possible to employ an extended guard-arm, which will absolutely prevent separation in a lateral direction under all circumstances. Perfect freedom is permitted in turning curves without undue strain on any part. It is adapted for cars of varying height.

Having thus fully described my invention, what I claim as new, and desire to secure by Letters Patent, is—

1. A twin coupling having each part provided with a shank, $a$, and pivoted nose B, substantially as described.

2. The combination of a pivoted nose and rigid shank with a guard-arm, substantially as described.

3. The combination, with the shank of the draw-head, of a pivoted nose having a lever-arm, substantially as described.

4. In combination with a draw-head or shank, a pivoted nose and lever-arm, and automatic locking mechanism, substantially as and for the purpose described.

5. The draw-head having the horizontal recess, in combination with the lever-arm, adapted to swing back into the recess, as described.

This specification signed and witnessed this 6th day of February, 1878.

ELI H. JANNEY.

Witnesses:

THEODORE S. WEST,
VANDALIA L. WEST.